United States Patent [19]

Grosch et al.

[11] 4,216,814
[45] Aug. 12, 1980

[54] BEAD CONSTRUCTION FOR A HEAVY DUTY PNEUMATIC TIRE

[75] Inventors: Karl A. Grosch, Roetgen, Fed. Rep. of Germany; Henri J. Mirtain; André M. Devienne, both of Compiegne, France; Jean Trzepaez, Thourotte Janville, France

[73] Assignee: Uniroyal GmbH, Aachen, Fed. Rep. of Germany

[21] Appl. No.: 898,243

[22] Filed: Apr. 20, 1978

[30] Foreign Application Priority Data

May 3, 1977 [DE] Fed. Rep. of Germany ... 7713948[U]

[51] Int. Cl.² .............................................. B60C 15/04
[52] U.S. Cl. .................................................. 152/362 R
[58] Field of Search ................................... 152/362 R

[56] References Cited

U.S. PATENT DOCUMENTS

| | | | |
|---|---|---|---|
| 3,052,275 | 9/1962 | Hylbert, Jr. | 152/362 R X |
| 3,736,974 | 6/1973 | LeJeune | 152/362 R |
| 3,777,799 | 12/1973 | Montagne | 152/362 R |

FOREIGN PATENT DOCUMENTS 2226293 11/1974 France ................................. 152/362 R Primary Examiner—John J. Love
Assistant Examiner—D. W. Underwood
Attorney, Agent, or Firm—Charles A. Blank

[57] ABSTRACT

A heavy duty pneumatic tire is provided with bead cores having polygonal cross-sectional configurations. The bead cores are composed of a multiplicity of wires arranged in densely superpositioned parallel layers which are situated on conical generating lines whose common axis coincide with the horizontal axis of the pneumatic tire and whose angles of opening are approximately 10°. The axially innermost and axially outermost wires in specified radially inner and radially outer layers lie on centerlines forming angles within selected ranges with the conical lines.

2 Claims, 4 Drawing Figures

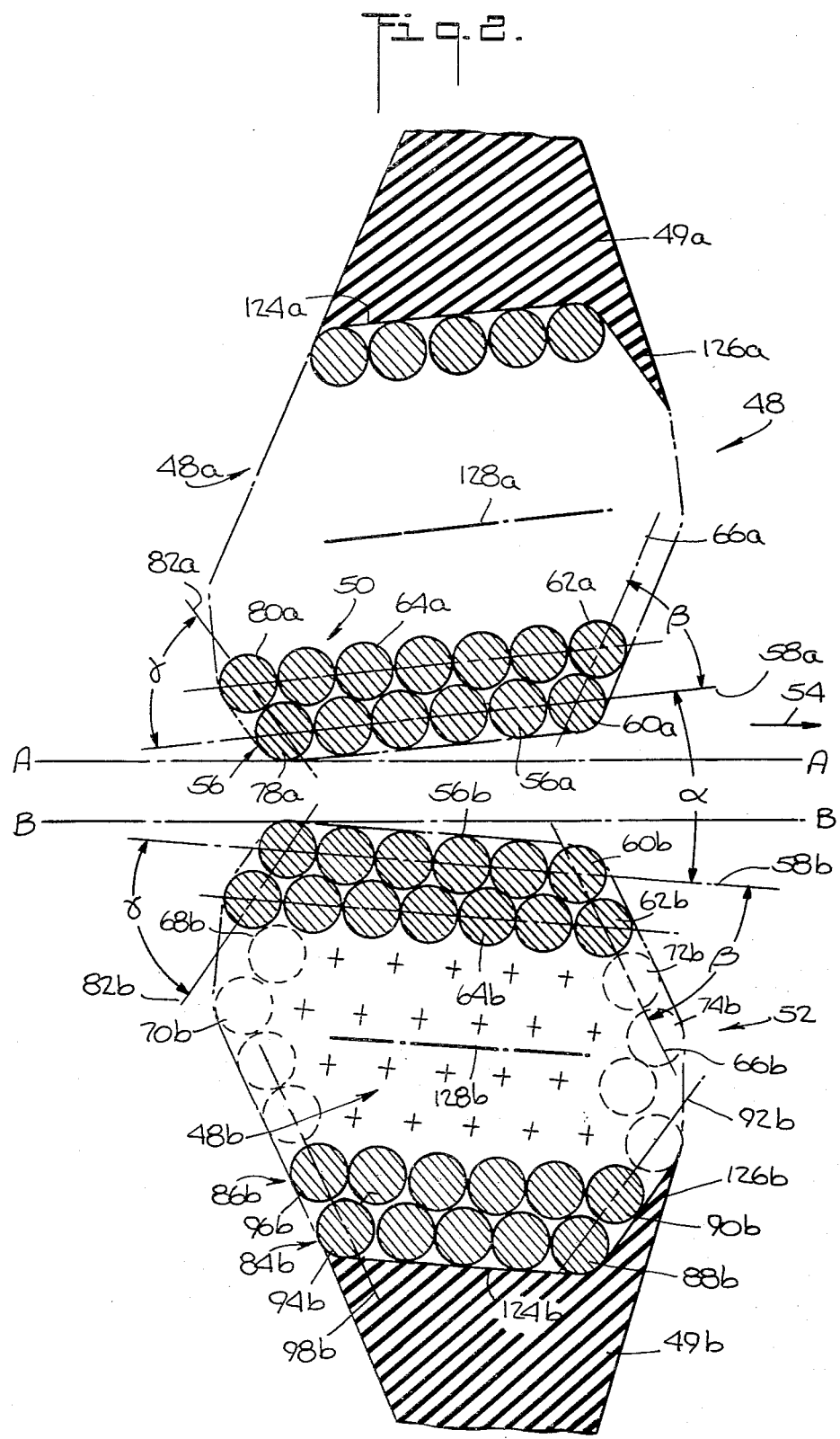

BEAD CONSTRUCTION FOR A HEAVY DUTY PNEUMATIC TIRE

BACKGROUND OF THE INVENTION

1. Field of the Invention

This invention relates to pneumatic tires and more particularly to a novel bead construction for heavy duty pneumatic tires.

2. Prior Art

Generally, heavy duty or high load bearing pneumatic tires include a radial carcass having at least one ply of rubberized steel cord fabric wrapped about a pair of bead cores formed from tightly packed windings of wires to create carcass flippers or turnups. Bead reinforcement strips may be arranged in a folding zone and extend radially outwardly beyond the turnups, and are usually separated therefrom by rubber masses. Positioned above each bead core and extending radially outwardly therefrom between the turnups if provided and the carcass ply is an apex strip of a hard rubber compound.

The purposes of the bead core are to guarantee a reliable seating of the tire on a wheel rim and to transmit to the rims the forces generated in the steel cords of the carcass due to the inflation pressure of the tire as well as operational loads. These forces are transferred to the individual windings in the bead cores. It has been found that the bead core will function optimumly when all of the wires in the core are uniformly subjected to such loads.

It is known in the art to design the bead core with a rectangular cross-sectional or hexagonal cross-sectional configuration. Such bead core designs are capable of attenuating a large portion of the energy of deformation and reliably transfering to the rim the stresses resulting from the forces in the carcass. These designs however do not guarantee that the bead wires will be subjected to such stresses.

The rims on which tubeless truck tires are mounted may have steep shoulders, i.e., the seat areas are oriented at an angle of 15° with respect to the tire axis. The bead cores are designed with various polygonal cross-sectional configurations such as parallelograms, trapezoids or longitudinally extending hexagons which are oriented obliquely at the same angle to the tire axis that the seat of the steep-shoulder rim is oriented. For example, in U.S. Pat. No. 3,757,844 the bead core is oriented parallel to the shoulder to guarantee that the individual windings of the core bear against the seat with equal pressure.

With conventional tapered rims, which can also be used for high load-bearing capacity tires, the seat of the rim is oriented with respect to the wheel axle at a slope of about 5°. The tires mounted on such tapered rims have as a rule multi-cornered bead cores whose wire windings are oriented parallel to the wheel axle. Such a construction does not guarantee a uniform distribution of the force in the wire windings, particularly the radially inwardmost wires of the bead core.

It is toward elimination of these and other drawbacks that the present invention is directed.

SUMMARY OF THE INVENTION

1. Purposes of the Invention

It is an object of the present invention to provide a pneumatic tire having an improved bead core design capable of transfering elevated forces generated during tire operation to the rim.

Another object of the present invention is to provide a pneumatic tire having an improved bead core design wherein the forces generated during operation of the tire are distributed uniformly over the windings in the bead core.

Still other objects and advantages of the present invention in part will be obvious and in part will become apparent as the description proceeds.

2. Brief Description of the Invention

Generally, a pneumatic tire in accordance with the present invention has a pair of bead cores of polygonal cross-sectional configuration which are formed from multiplicities of wires wound in densely superimposed parallel layers. The layers in each bead core lie on conical first lines whose common axis coincides with the tire axis and whose angles of opening have a value of approximately 10°. The lines open axially outwardly. The width of the layers and the number of wires in each layer vary according to a predetermined pattern.

The two radially innermost layers may have their axially outermost wires lying on a second line making an angle of from about 60° to about 85° with the first line. These layers may have their axially innermost wires lying on a third line making an angle of from about 60° to about 120° with the first line.

Moreover, at least the two radially outermost layers may have their axially outermost wires lying on a fourth line parallel to the third line and may have their axially innermost wires lying on a fifth line parallel to the second line.

In accordance with one embodiment wherein the cross-sectional configuration of the bead core is either hexagonal or octagonal, the number of layers in the bead core is equal to or is one greater than the number of wires in the widest layer. Moreover, the axially innermost and axially outermost wires in at least the two radially innermost layers lie at angles of 60° and the axially innermost and axially outermost wires in at least the three radially outermost layers also lie at angles of 60°.

A substantially triangularly cross-sectionally configured apex strip of a hard rubber compound is provided which extends radially of and from the bead core and forms a rigid unit with the bead core. If the bead core is of a hexagonal or octagonal cross-sectional configuration, the apex strip contacts said bead core along two contiguous radially outward sides of the bead core.

The invention consists of the features of construction and arrangement of parts which will be detailed hereinafter and described in the appended claims.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

FIG. 2 is an enlarged cross-sectional view through the bead core constructed in accordance with the present invention in which the core portions have been moved radially inwardly.

DESCRIPTION OF THE PREFERRED EMBODIMENTS

As used in the specification and the claims, the terms "axially inward" and "axially outward" are used with reference to a bead core of the tire, that is, "axially inward" refers to a vector extending from the bead core to the opposite bead core. Conversely, "axially outward" refers to a vector extending outwardly away from the bead core. The terms "radially inward" and "radially outward" are used with reference to the axis of rotation of the tire, that is, "radially inward" refers to a vector directed radially toward the axis, while, the term "radially outward" refers to a vector extending radially from the axis.

Figure 1:
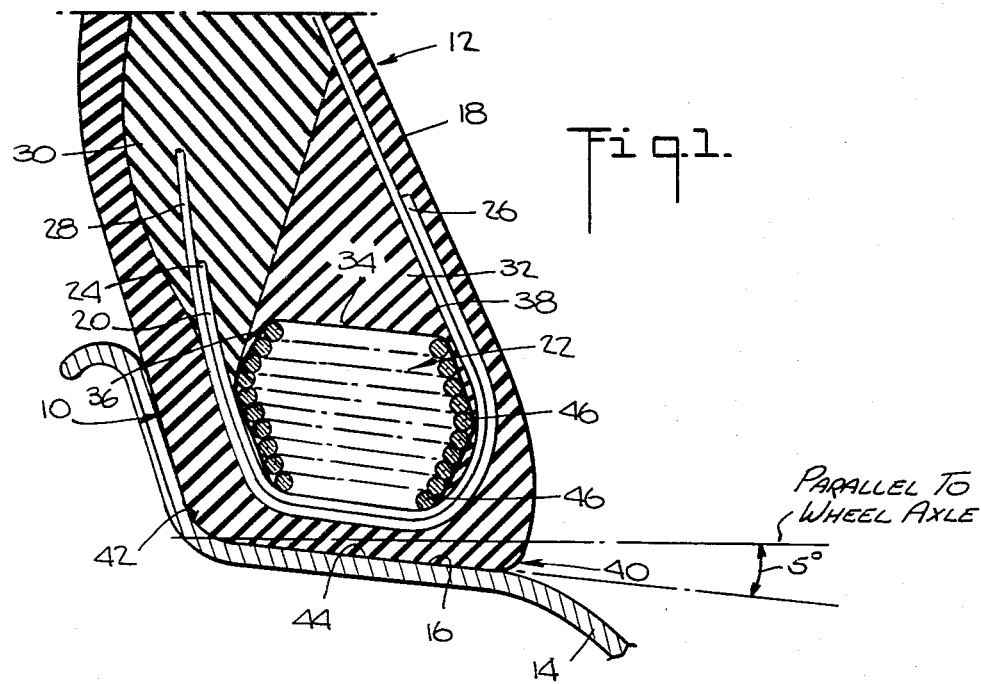
FIG. 1 is a partial cross-sectional view of a bead area of a pneumatic tire constructed in accordance with the present invention.

With reference to FIG. 1, there is illustrated the bead area 10 of a tire 12 constructed in accordance with one embodiment of the present invention. While only one bead area of the tire is illustrated, it is to be understood that the other bead area not illustrated is the same as that illustrated, but opposite in hand.

The tire 12 is a high load carrying capacity pneumatic tire for use on trucks, heavy duty and/or large size vehicles. It is designed to be mounted on a 5° tapered rim 14 which has a seating area 16 sloped at an angle of approximately 5° to the wheel axle. The general construction of such a tire is known in the art and will not be described in detail herein. Basically, the tire 12 includes a carcass 18 of at least one ply of rubberized cord reinforced fabric having its radially inward end a turnup portion 20 wrapped about an inextensible bead core 22. The terminal edge 24 of the turnup 20 extends radially outwardly of the bead core 22 and is spaced axially outwardly of the carcass 18. Forming generally a radially outward extension of the turnup 20 is at least one reinforcement strip 26 consisting of a ply of rubberized cord fabric wrapped about the bead core 22. As shown, the terminal edge 24 of the turnup 20 and the terminal edge 28 of the reinforcement strip 26 are embedded in a rubber mass 30 having a particularly elastic and high energy absorbing capacity.

The bead area 10 includes a reinforcement unit composed of the bead core 22 and an annular apex strip 32 made of a hard rubber compound which extends circumferentially of the tire and radially outwardly from the bead core 22. The apex strip is of a generally triangular cross-sectional configuration, and along its base 34 bears directly against the radially outwardly oriented faces 36 and 38 of the bead core 22 so that the bead core and the apex strip make contact over a substantial area and together, constitute a rigid reinforcement unit. Compared to its width, the apex strip is of comparatively low radial elevation. Such a bead core and apex strip combination creates a relatively long path of shear between the carcass and the reinforcement unit.

As shown in FIG. 1, the bead area 10 terminates at a toe 40 at its radially and axially innermost edge and at a heel 42 at its radially innermost, axially outermost edge which define a bead sole or seat 44. When the tire is in normal operation, the bead area 10 is mounted on the rim 14 so that the seating area 16 on the rim engages and supports the seat 44 of the bead.

The bead core 22, having a polygonal cross-sectional configuration as described in detail hereinafter, is made from a multiplicity of wires 46 wound in an orientation perpendicular to a vertical plane passing through the bead core, i.e., the wires are oriented concentrically to the circumference of the rim without any helical twist. The wires 46 have identical cross-sectional configurations and are wound in densely superpositioned layers with each of the layers arranged conically in the bead core. The wires in the bead core can be of round or square cross-section. They can be rubber-coated and, in the event of the formation of a lamallae-shaped wire bundle, need not have any rubber coating. The width of the individual layers and consequently the number of wires in each layer may vary according to a predetermined pattern so that the bead core may have different polygonal cross-sectional configurations as will be explained.

As can be seen best in FIG. 2, the annular bead core 48 can be sectioned vertically into portions 48a and 48b. The portion 48a is a mirror image of the portion 48b. In the discussion which follows concerning FIG. 2, the use of a letter suffix "a" with a reference numeral indicates that its associated structure appears in portion 48a and the use of the suffix "b" indicates that its associated structure appears in portion 48b. Associated with the bead core 48 is an apex strip 49.

The bead core 48 is made of a multiplicity of wires 50 of which, only those necessary to adequately explain the invention are shown to preserve clarity. The wires 50, as noted hereinabove, form layers 52 in which the wires are parallel to each other and in which the wires are oriented conically in the bead core. In FIG. 2, the arrow 54 indicates the axially outward direction and the lines A—A and B—B are parallel to the horizontal axis of the tire.

The radially innermost layer 56 is signified by 56a and 56b and is oriented conically so that the center to center connecting lines or first lines 58a and 58b make an angle α of approximately 10°. Lines 58a and 58b lie at angles of ½α with respect to the lines A—A and B—B respectively and consequently, angles of ½α with respect to the horizontal axis of the tire. The remaining layers in the bead core 48 likewise lie along conical center to center connecting lines making an angle of approximately 10°.

The axially outermost wire 60a in the radially innermost layer 56a and the axially outermost wire 62a in the immediately adjacent layer 64a may lie along a second center to center connecting line 66a which forms an angle β of from about 60° to about 85° with the first line 58a. As will be described hereinafter, the size and shape of the bead core can vary depending on the number of wires in each layer, however, in accordance with the present invention there are at least two layers in each bead core configuration, i.e., the radially innermost layer and the immediately adjacent layer which have their axially outermost wires lying on a center to center connecting line making an angle of from about 60° to about 85° with respect to the center to center connecting line for the layers in the bead core. For example, as shown in portion 48b, two additional layers 68b and 70b have their axially outermost wires 72b and 74b respectively, lying on the same line 66b as the wires 60b and 62b.

Similarly, the axially innermost wires 78a and 80a in the two radially innermost layers 56a and 64a respectively lie along a third center to center connecting line 82a which makes an angle γ of approximately 60° to 120° with the first line 58a. As noted hereinabove with respect to the axially outermost wires, the axially innermost wires of more than the two radially innermost layers may lie along the third line 82a as well.

As can be seen best in portion 48b, at least the two radially outermost layers 84b and 86b have their axially outermost wires 88b and 90b respectively oriented along a fourth center to center connecting line 92b which is parallel to the third line 82b making an angle γ with respect to the center to center connecting line for the layers in the bead core. Moreover, the axially innermost wires 94b and 96b in the layers 84b and 86b respectively have a fifth center to center connecting line 98b which is parallel to the second line 66b. Obviously, depending upon the cross-sectional configuration selected for the bead core, the axially innermost and axially outermost wires in more than the two radially outermost layers may be situated likewise.

Where the bead core 48 assumes a hexagonal or octagonal cross-sectional configuration, there are at least two radially innermost layers having their axially outermost and axially innermost wires lying on second and third lines respectively which make angles β and γ of 60°. Preferably, in addition, there are at least three radially outermost layers having their axially outermost and axially innermost wires lying on fourth and fifth lines respectively which are parallel to the second and third lines.

Figure 3:
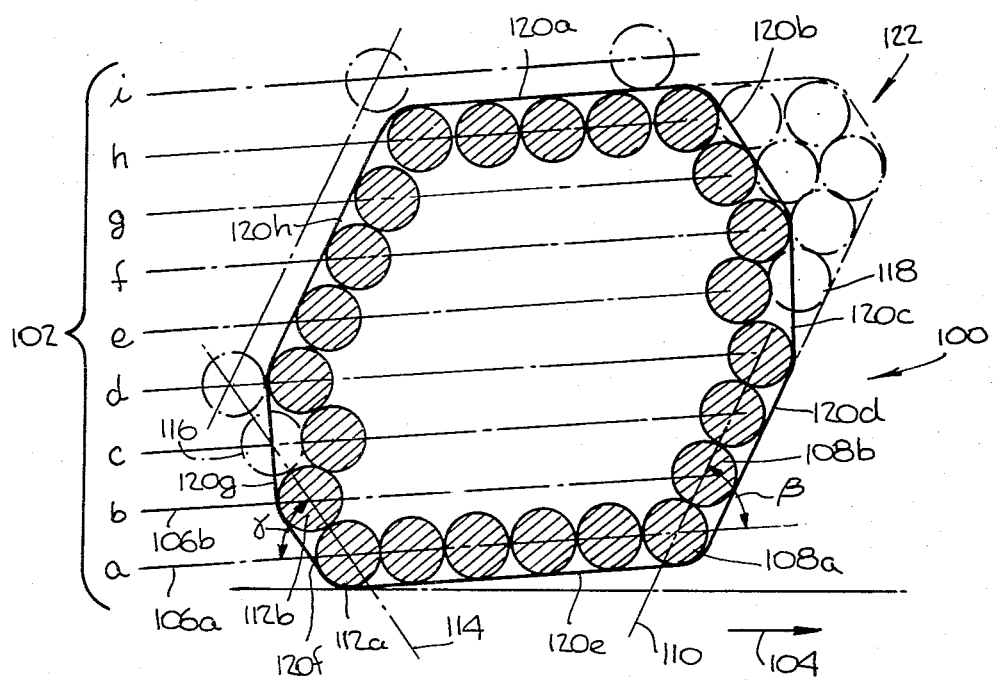
FIG. 3 is a cross-sectional representation of one of the core portions illustrated in FIG. 2.

It was noted hereinabove that the axial width of each layer in the bead core and consequently, the number of wires in each layer can vary according to a predetermined pattern so that the bead core may have different polygonal cross-sectional configurations. With reference to FIG. 3, there is shown a bead core 100 which is composed of a multiplicity of layers 102a through 102i. The arrow 104 indicates the axially outward direction. Note that for clarity, only the axially innermost and axially outermost wires in most of the layers are shown. In accordance with the above discussion, the two radially innermost layers 102a and 102b lie on first center to center connecting lines 106a and 106b. The layer 102b has one more wire than the layer 102a. The axially outermost wires 108a and 108b of at least the layers 102a and 102b respectively lie along a second line 110 which makes an angle β with the first line 106a. Furthermore, the axially innermost wires 112a and 112b of the layers 102a and 102b respectively lie along the line 114 which makes an angle γ with the line 106a.

Figure 4:
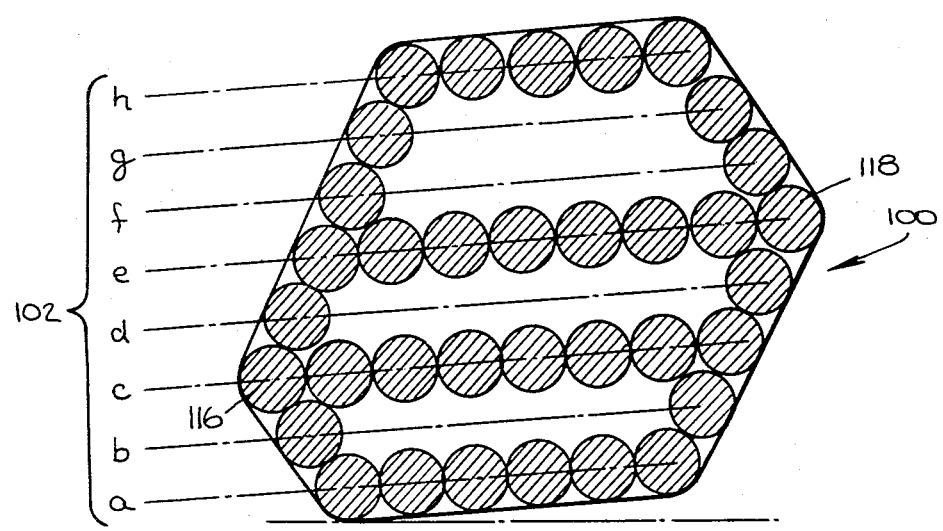
FIG. 4 is a cross-sectional representation of one of the core portions represented partially in broken-line construction in FIG. 3.

If the wires 116 and 118 are included in the layers 102c and 102e respectively, the bead core 100 assumes a hexagonal cross-sectional configuration, as represented in FIG. 4. By removing the wires 116 and 118, the bead core assumes an octagonal cross-sectional configuration. Consequently, one can start with a basic bead core design having an octagonal cross-sectional configuration with a circumference of segments 120a through 120h as shown in FIG. 3. From this basic configuration, bead cores of various cross-sectional configurations can be obtained. Such flexibility is required since bead cores of different power absorption capacities are required for different applications. Beginning with the basic bead core, the absorption capacity can be increased by increasing the number of wires along the side of the bead core coming into direct contact with the apex strip. One would add an additional layer of wires 102i along the radially outward side 120a and would increase the number of wires in the layers 102d through 102h by one wire along the axially inward face 120h. In this way, it is possible to enlarge the cross-sectional area of the bead core which results in increased energy absorption without changing the cross-sectional configuration.

If one wishes to enlarge the area over which the apex strip makes contact with the bead core without substantially enlarging the cross-sectional area of the bead core, it is possible to enlarge the radially outwardly situated surface of the bead core in an axially outward direction by adding wires in the area enclosed by dashed lines 122 in FIG. 3. In this case, the cross-sectional configuration of the bead core is changed to orthorhombic and the length of the sides 120e, 120f, 120g and 120h remain unchanged. In this situation, additional wires are added to layers 102e, f, g and h with the same angular orientations as the layers in the basic bead core.

Preferably, in the instances where the bead core is of hexagonal or octagonal cross-section, the number of layers in the bead core equal or is one more than the number of wires in the widest layer in the bead core. Furthermore, as can be seen in FIG. 2, if the bead core 48 has an octagonal cross-sectional configuration, the apex strip 49 contacts the bead core 48 along its two radially outward contiguous surfaces 124a and b and 126a and b. This holds true if the bead core is of a hexagonal cross-sectional configuration as well. In addition, if the bead core is of octagonal cross-sectional configuration, the shape may be asymmetrical with respect to the lines 128a and 128b which are parallel to the first center to center connecting lines.

In a bead core constructed in accordance with the above principles, due to the orientation of the layers, the wires in the bead core are subjected to the same strains and stresses. This feature applies not only to the wires located near the wheel rim but also to those radially outwardly therefrom. The bead core is compact, has an increased force absorption capacity and as noted, forms with the apex strip an essentially rigid reinforcement unit. Furthermore, the bead core is a favorable base for anchoring the tire to the wheel rim.

As can be seen from the foregoing, the objects of the present invention, namely to provide an improved bead construction for a heavy duty pneumatic tire have been accomplished by a bead core having a polygonal cross-sectional configuration composed of a multiplicity of wires wound concentrically to the circumference of the wheel rim in densely superpositioned layers. The layers are parallel and are oriented on conical first lines with an angle of opening of approximately 10°. The axially outermost wires in at least the two radially innermost layers have their centers lying on a second line making an angle of from about 60° to about 85° with respect to the first lines. The axially innermost wires in at least the two radially innermost layers may have their centers lying on a third line making an angle of approximately 60° to 120° with respect to the first lines. Similarly, the axially outermost wires in at least the two radially outermost layers may have centers lying on a line parallel to the third line and the axially innermost wires in at least the two radially outermost layers have centers lying on a line parallel to the second line.

The tire also includes an annular apex strip of a hard rubber compound having a substantially triangular cross-sectional configuration extending radially of and from the bead core. The bead core and apex strip form an essentially rigid reinforcement unit.

If the bead core is of a hexagonal or octagonal cross-sectional configuration, the apex strip contacts the bead core along at least two contiguous radially outward surfaces.

While in accordance with the patent statute preferred and alternative embodiments have been described in detail, it is to be understood that the present invention is not limited thereto or thereby.

What is claimed is:

1. A pneumatic heavy service tire for mounting onto an about 5° tapered seat rim comprising:
   (a) a pair of bead cores each having a polygonal cross-sectional configuration composed of a plurality of wires, said wires being wound in compact layers in which the centers of the wires in each innermost layer lie along first conical lines having an axially outwardly opening angle $\alpha$ and of approximately 10° with respect to each other and the axially outermost wires in at least two radially innermost layers lie on second lines making an angle of between about 60° to about 85° with said first lines and the axially innermost wires in at least two innermost layers lie along third lines forming an angle of between about 60° to about 120° with said first lines, the cross-sectional configuration of each core being asymmetrical with respect to the mid-axis thereof that lies parallel to each wire layer and parallel to the about 5° tapered seat of the rim when the tire is mounted thereon, each of said bead cores being of a hexagonal cross-sectional configuration and the number of layers in each of said bead cores being equal to the number of wires in the widest layer;
   (b) sidewalls;
   (c) a carcass of at least one ply of rubberized metallic cord fabric having its end portions wrapped radially around said bead cores to form turnups which are axially displaced from the remaining portions of said carcass; and
   (d) an annular apex strip of a hard rubber compound having a substantially triangular cross-sectional configuration extending radially of and from each of said bead cores and forming a rigid unit with said bead cores.

2. A pneumatic heavy service tire for mounting onto an about 5° tapered seat rim comprising:
   (a) a pair of bead cores each having a polygonal cross-sectional configuration composed of a plurality of wires, said wires being wound in compact layers in which the centers of the wires in each innermost layer lie along first conical lines having an axially outwardly opening angle $\alpha$ and of approximately 10° with respect to each other and the axially outermost wires in at least two radially innermost layers lie on second lines making an angle of between about 60° to about 85° with said first lines and the axially innermost wires in at least two innermost layers lie along third lines forming an angle of between about 60° to about 120° with said first lines, the cross-sectional configuration of each core being asymmetrical with respect to the mid-axis thereof that lies parallel to each wire layer and parallel to the about 5° tapered seat of the rim when the tire is mounted thereon, each of said bead cores being of octagonal cross-sectional configuration and the number of layers in each of said bead cores being equal to the number of wires in the widest layer;
   (b) sidewalls;
   (c) a carcass of at least one ply of rubberized metallic cord fabric having its end portions wrapped radially around said bead cores to form turnups which are axially displaced from the remaining portions of said carcass; and
   (d) an annular apex strip of a hard rubber compound having a substantially triangular cross-sectional configuration extending radially of and from each of said bead cores and forming a rigid unit with said bead cores.

* * * * *